Patented May 6, 1930

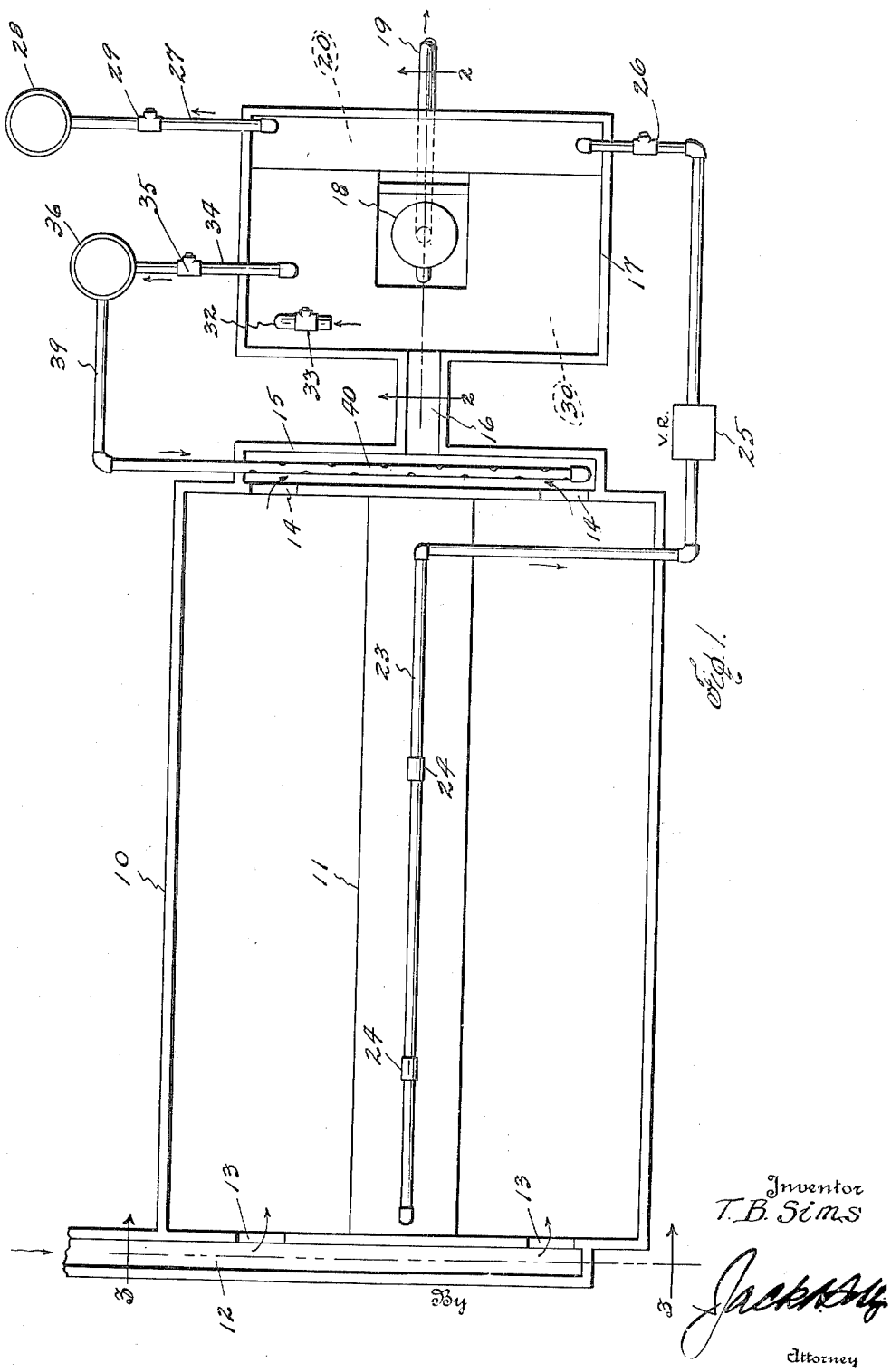

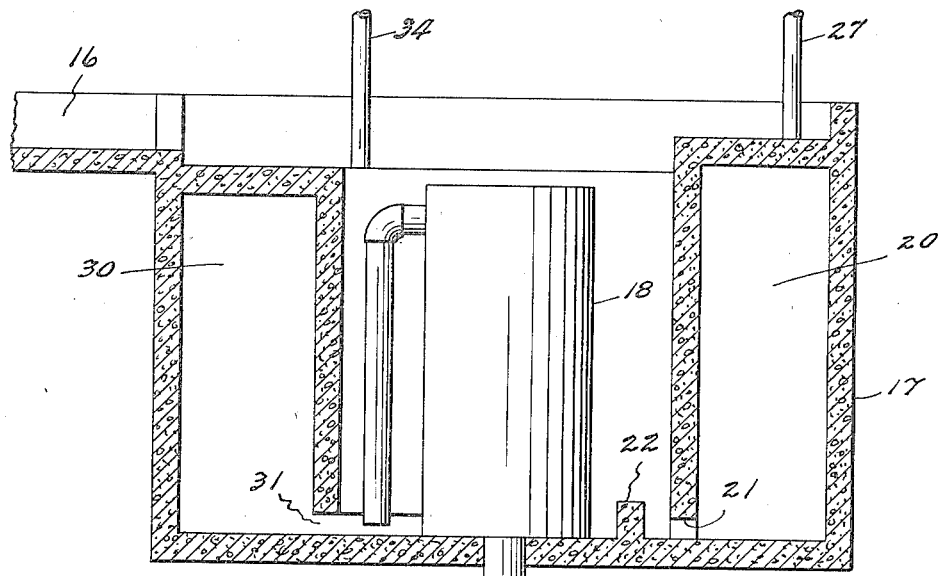
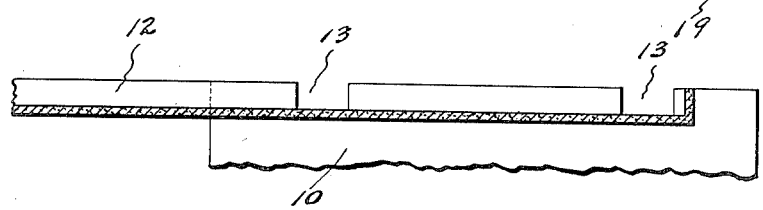
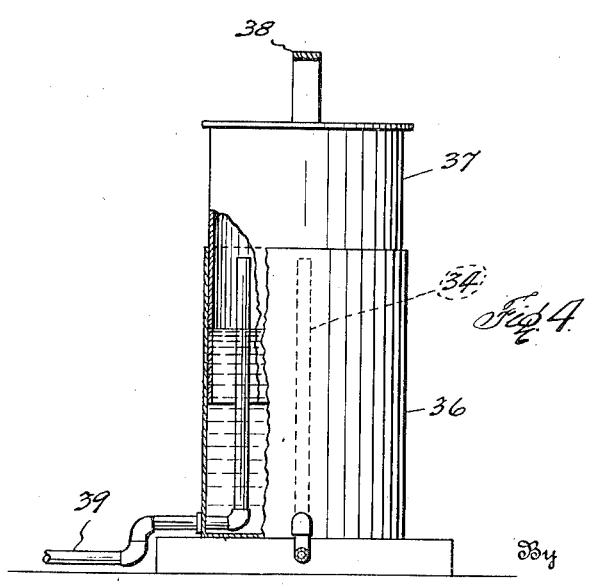

1,757,264

UNITED STATES PATENT OFFICE

THOMAS B. SIMS, OF CLEBURNE, TEXAS

SEWAGE-DISPOSAL SYSTEM

Application filed April 29, 1929. Serial No. 358,947.

This invention relates to new and useful improvements in sewage disposal systems.

The invention has to do with that type of system in which a sedimentation tank is employed in connection with a dosing tank and a spray bed.

One object of the invention is to aerate the liquid at some suitable point in its travel through the plant and particularly to carry out the aerating operation without the use of auxiliary power, thus making for economy and simplicity as well as a low cost of operation and maintenance.

A further object of the invention is to combine with the system set forth in my application filed April 12, 1928, Serial No. 272,342, wherein sedimentation is carried out under a vacuum and the gas is also extracted, means for aerating either the influent or the effluent, whereby the hydrogen sulphite gases are expelled and objectionable odors are substantially eliminated and a more stable sewage disposal system is produced.

Still another object of the invention is to utilize the rise and fall of the water in the dosing tank to supply air for aerating the sewage liquid, thus eliminating pumps and power operators therefor.

A construction designed to carry out the invention will be hereinafter described together with other features of the invention.

The invention will be more readily understood from a reading of the following specification and by reference to the accompanying drawings in which an example of the invention is shown, and wherein:

Figure 1 is a plan view showing a system constructed in accordance with the invention, Figure 2 is a transverse vertical sectional view taken on the line 2—2 of Figure 1, Figure 3 is a transverse sectional view taken on the line 3—3 of Figure 1, and Figure 4 is an elevation of the air storage tank.

In the drawings the numeral 10 designates a sedimentation tank which may be similar to that shown in my co-pending application hereinbefore referred to and which has a longitudinal sealed gas and vacuum chamber 11. The influent from the sewer (not shown) is discharged into a gutter 12 which has gaps 13 forming inlets to the tank 10. The influent is handled in the tank in the usual way, whereby the heavy matter is settled to the bottom and the liquid flows from the tank. The out-flowing liquid, or effluent, discharges through gaps 14 at the opposite end of the tank into a gutter 15.

The effluent is made to flow from the gutter 15 through a sluice 16 into a dosing vat or tank 17. In the center of this vat is arranged the usual siphon regulator 18, which is a common installation in all dosing vats now used and forms no part of the invention. A discharge pipe 19 leads from the vat to the spray bed. The function of the regulator 18 is to periodically discharge the effluent from the vat and to close the pipe 19 until the vat has refilled for another discharge. The discharge of the water from the vat, which is usually elevated above the spray bed, is comparatively rapid.

Across one side of the vat a longitudinal vacuum chamber 20 is constructed. This chamber has an opening 21 at its bottom. A baffle wall 22 is constructed in front of this opening and extends above the latter so as to maintain a water seal in the bottom of the chamber when the water is discharged from the vat, thus preventing the entrance of air into said chamber. A vacuum pipe 23 extends from the chamber 11 to the chamber 20 and enters the top of the latter. The pipe 23 is connected with the chamber 11 by branches 24 and includes a vacuum regulator 25 and a check valve 26.

As set forth in my co-pending application hereinbefore referred to, the vacuum created in the chamber 11 will not only tend to carry off the gases, but will hasten sedimentation. The chamber 11 being sealed, it is obvious that no air can enter the same. The check valve 26 prevents the entrance of air into the pipe 23 from the chamber 20.

It is obvious that as the water rises in the vat it will also rise in the chamber 20 and the gas entrapped in said chamber will be expelled through a pipe 27 leading to a receiving tank 28 from which it may be conducted to a burner or utilized for other purposes. The pipe 27 includes a check valve 29 which prevents gas flowing back into the chamber 20. When the water is discharged from the vat 17 its downward movement in the chamber 20 will create a suction, whereby a vacuum is set up through the pipe 23 and pipes 24. The regulator 25 is set so that the chamber 11 is constantly under a vacuum and the periodic operation of the chamber 20 is ample to maintain this vacuum.

A substantially U-shaped vertical air pressure chamber 30 is also constructed in the vat 17 and placed around the regulator 18. This chamber has an unobstructed opening 31 at its bottom. An air inlet pipe 32 provided with a check valve 33 is connected to the top of the chamber 30 so as to admit air but prevent its escape. A discharge pipe 34 including a check valve 35 leads to an air receiver or storage tank 36, which is best shown in Figure 4. The tank has a pressure dome 37 telescoping into its upper end and sealed in water in the bottom of said tank. A stop 38 limits the upward movement of the dome and prevents breaking the seal. The pipe 34 extends upward in the tank above the water level. A discharge pipe 39 extends from the upper portion of the tank down through the water and out through the side of the tank. This pipe 39 is connected with a perforated aerating pipe 40 located in the gutter 15.

It will be seen that when the water is discharged from the vat 17 air will be drawn in through the pipe 32 and when the water again flows into the vat the valve 33 will be closed and the air in the chamber 30 will be forced out through the pipe 34 and discharged into the dome 37. The discharged air will not only be stored, thus providing ample supply, but will be placed under pressure. Consequently air under pressure will be supplied through the pipe 39 and discharged from the pipe 40 into the effluent which will be thoroughly aerated.

The creating of the vacuum and the supply of air will be entirely automatic and will not require any auxiliary power or the attention of an operator. There will be practically no cost to the operation. A test plant which has been constructed has proven to operate substantially free from objectionable odors. It has been demonstrated that a plant of this character can be located in close proximity to a community without giving off objectionable odors and may be maintained and operated at much less expense than those systems now in common use which have come under my observation.

Various changes in the size and shape of the different parts, as well as modifications and alterations, may be made within the scope of the appended claims.

What I claim, is:

1. The system of treating sewage and impure liquids which comprises introducing the liquid into a settling chamber, conducting the liquid from the chamber to a dosing vat, utilizing the rise and fall of the liquid in the dosing vat to provide a supply of air, and introducing air into the liquid to aerate the same.

2. The system of treating sewage and impure liquids which comprises introducing the liquid into a settling chamber, conducting the liquid from the chamber to a dosing vat, utilizing the rise and fall of the liquid in the dosing vat to provide a supply of air, and introducing air from said supply into the liquid prior to its entrance into the dosing vat to aerate said liquid.

3. The system of treating sewage and impure liquids which comprises introducing the sewage liquid into a settling tank, conducting said liquid from the tank to a dosing vat arranged to periodically discharge the liquid therefrom, means in the dosing vat operated by the rise and fall of the liquid therein for supplying air, and means connected with said air supply for introducing air into the liquid at some point in the flow of the liquid prior to its entrance into the settling tank or after its discharge therefrom for aerating said liquid.

4. The system of treating sewage and impure liquids which comprises introducing the sewage liquid into a settling tank, conducting said liquid from the tank to a dosing vat arranged to periodically discharge the liquid therefrom, means in the dosing vat operated by the rise and fall of the liquid therein for supplying air, a storage tank connected with said air supply for storing air under pressure, and means connected with the storage tank for introducing said air under pressure from the tank into the liquid prior to its entrance in the dosing vat.

5. The system of treating sewage and impure liquids which comprises introducing the sewage liquid into a settling tank, conducting said liquid from the tank to a dosing vat arranged to periodically discharge the liquid therefrom, a chamber in the dosing vat sealed at its top and having an opening at its bottom for admitting water, a pressure storage tank, a pipe leading from the chamber to the storage tank, a valve controlled air inlet connected with the chamber, and a perforated discharge pipe connected with the pressure tank and immersed in the flowing liquid.

6. The system of treating sewage and impure liquids which comprises introducing the sewage liquid into a settling tank, conducting said liquid from the tank to a dosing vat arranged to periodically discharge the liquid therefrom, a chamber in the dosing vat sealed at its top and having an opening at its bottom for admitting water, a pressure storage tank, a pipe leading from the chamber to the storage tank, a valve controlled air inlet connected with the chamber, a perforated discharge pipe connected with the pressure tank and immersed in the flowing liquid, the air inlet of the chamber being arranged to admit air while water is being discharged from the vat and to close upon the rise of water in said chamber, and a control valve in the connection between the chamber and the pressure tank aranged to close upon a back pressure from said tank.

7. The system of treating sewage and impure liquids which comprises settling the heavier sludge in a sludge chamber, flowing the lighter sludge and scum upward into a sealed chamber, utilizing the rise and fall of the liquid in a dosing vat for creating a vacuum in said sealed chamber above the liquid, whereby gases are induced to flow upward from the sludge chamber into the sealed chamber, also utilizing the rise and fall of the water in the dosing chamber to create a supply of air under pressure, and introducing said air under pressure into the liquid prior to its entrance into the dosing chamber, whereby said liquid is aerated.

8. As a sub-combination in a sewage disposal system, a dosing vat having a vacuum chamber provided with a water seal at its bottom for excluding air from said chamber, and an air pressure chamber in said vat having a water entrance at its bottom and an air entrance at its top.

In testimony whereof I affix my signature.

THOMAS B. SIMS.